July 18, 1933.  H. C. WARNER  1,919,050
ELECTRIC COOKER
Filed May 25, 1931
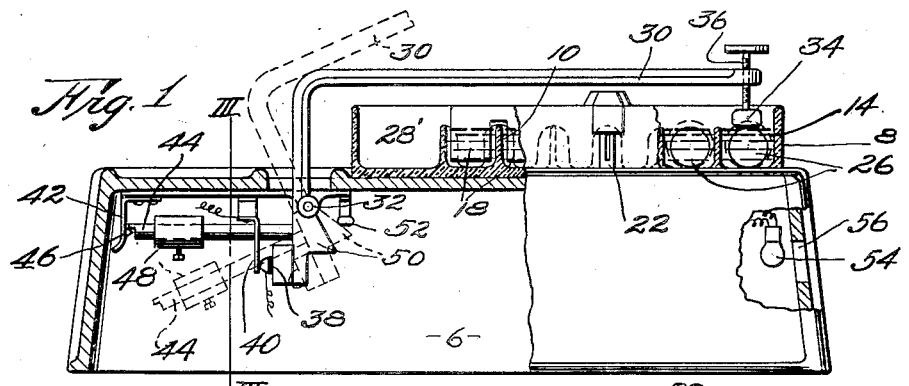
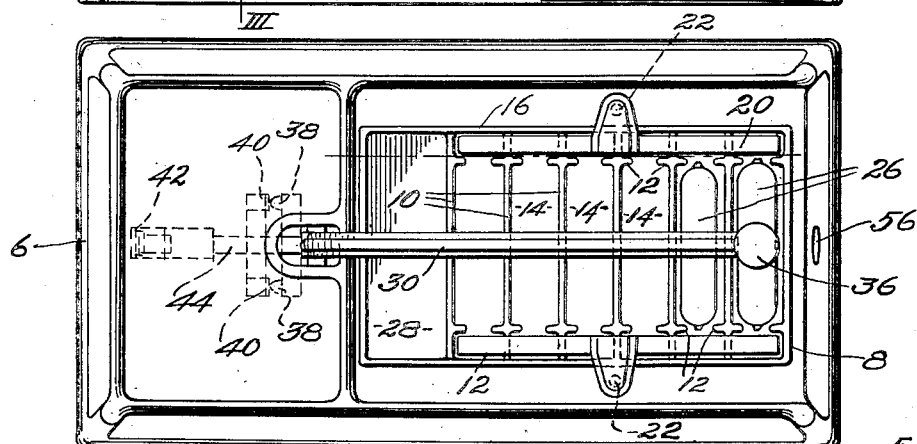
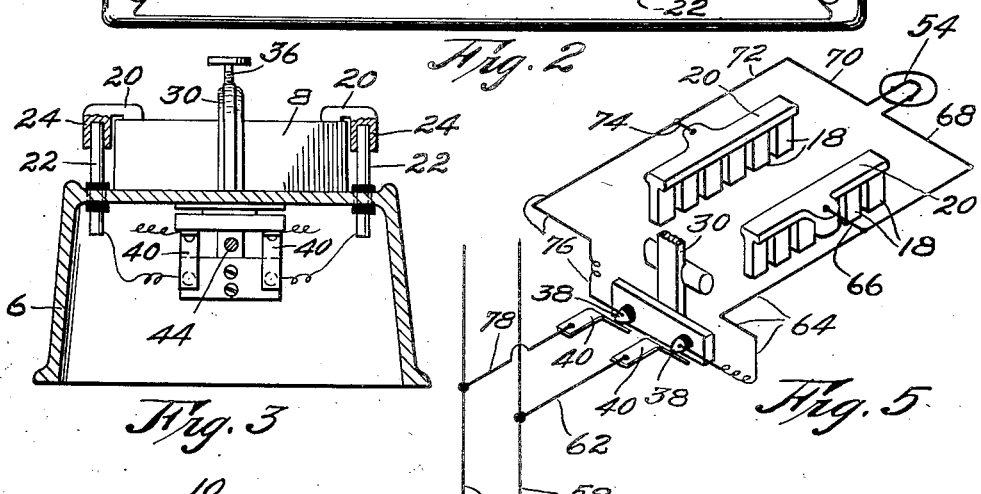
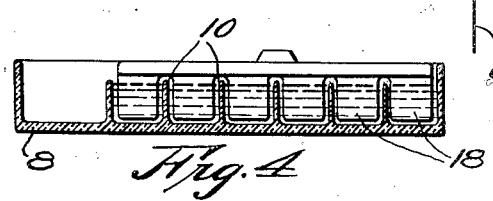
INVENTOR,
Harry C. Warner.
BY Hovey F. Hamilton,
ATTORNEYS.

Patented July 18, 1933

1,919,050

UNITED STATES PATENT OFFICE

HARRY C. WARNER, OF KANSAS CITY, MISSOURI, ASSIGNOR OF ONE-FOURTH TO WILLIAM F. HALL, OF KANSAS CITY, MISSOURI

ELECTRIC COOKER

Application filed May 25, 1931. Serial No. 539,827.

This invention relates to electrical cooking devices wherein is embodied unique means for automatically cutting off the supply of electrical energy after the material being cooked assumes a predetermined condition as a result of the cooking action.

The primary object of the instant invention is to provide such a cooker, wherein is embodied novel electrical contacts which may be opened to cut off the supply of current by the movement of an overhanging arm, a portion of which is positioned to be acted upon by material being cooked when it has altered its shape in a known predetermined manner.

An even further object of the invention is the contemplation of a cooker of the character mentioned wherein is provided a novel tray and electrode combination which co-act to hold and supply cooking heat respectively to material being acted upon.

Minor objects of the invention including specific means for performing the broader objects of the invention will appear during the course of the detailed specification, referring to the accompanying drawing, wherein:

Figure 1 is a broken side elevation of an electric cooker embodying the features of this invention.

Fig. 2 is a top plan view of the same.

Fig. 3 is a vertical cross section through the cooker, taken on line III—III of Fig. 1.

Fig. 4 is a vertical longitudinal central section through the tray only, and,

Fig. 5 is a diagrammatical showing of the electrical circuit which may be embodied in a cooker of the design contemplated.

Like reference characters are used to designate similar parts throughout the several views of the drawing, and the numeral 6 indicates a base which may be made of suitable material and formed with a hollow interior to house the make and break mechanism hereinafter set down.

Base 6 removably supports a tray 8, essentially made of insulating material, or at least sufficiently coated with such material to preclude short circuiting. The specific structure of tray 8 is clearly shown in Figs. 1, 2 and 4, and should consist of a plurality of transverse partitions 10, each of which is provided with laterals 12 adjacent each end thereof, whereby to form a material receiving compartment 14, intermediate small end compartments 16 which receive depending lugs 18 formed on each electrode 20. It is these lugs 18 which depend into tray 8 from their respective terminal post 22, supported and insulated from base 6.

Each electrode 20 has a socketed boss 24 which slips over the respective terminal post 22 in a manner to set up an electrical contact. Laterals 12 are of sufficient length to maintain material 26 within its compartment 14, yet allows water to pass into each compartment 16 from the adjoining compartment 14. It is through this water and material 26 that contact is made between electrodes 20 and resistance of the same causes the desired heating. A sump 28 formed at one end of tray 8 receives surplus water when material 26 swells and forces some of the water from compartments 14. To allow for this action, partitions 10 are made shorter so that overflowing from compartments 14 will not at the same time overflow tray 8.

To carry out the salient feature of this invention it is desired to provide means for cutting off the supply of electricity to electrodes 20 when material 26 reaches a predetermined condition during its cooking. In some instances material 26 may shrink, while in most instances it will expand. Mechanism for performing the above mentioned function is here described to operate when material 26 swells to a predetermined size.

An overhanging arm 30 is pivotally secured as at 32 to base 6, with its end above tray 8, as shown in Fig. 1. An adjustable material contacting member 34 is carried at the end of arm 30 to project into one compartment 14 and against material 26 being cooked therein. Adjustment of member 34 toward and from material 26 may be effected by a screw-threaded shank 36 and the time of trip be gauged by the relative position of this adjustable member 34. Arm 30 carries a pair of contact points 38 which engage contact leaves 40 when the machine is in the set position. When in this position, arm 30 is yieldably maintained by a resilient trigger 42 which engages the notched end of rod 44, as illustrated in Fig. 1. Shoulder 46, carried by trigger 42, underlies a small projected portion of rod 44 and when upward pressure against member 34 is sufficient to overcome the holding effect of trigger 42, adjustable weight 48, mounted on rod 44, moves arm 30 about pivotal point 32 and thereby disconnects contacts 38 and 40. This parting movement caused by the action of gravity on weight 48 moves arm 30 until its shoulder 50 engages stop 52. This position is shown in dotted lines of Fig. 1, and water and material 26 within tray 8 is no longer being heated.

Within the circuit of the machine is disposed an electric lamp 54 which projects its rays through window 56, formed through the end wall of base 6. This lamp acts as a signal to inform the operator when the electrodes are receiving electrical energy, and when the circuit is broken by the movement of arm 30, this lamp goes out.

Fig. 5 illustrates one form of a wiring diagram which may be followed by assuming that lines 58 and 60 are the two main lines supplying electricity. From line 50 the circuit is completed through conductor 62, contact 40, contact 38, and thence through wires 64 to branch 66 and electrode 20. A wire 68 carries energy to lamp 54, from whence the circuit is completed through conductors 70 and 72 to branch 74, where electrode 20 receives its supply. From this point wires 76 complete the circuit to contact points 38 and 40, from whence wire 78 joins line 60.

Many modifications might be embodied in a machine of this character without departing from the broad concepts of the invention and it is desired to be limited only by the scope of the appended claims.

Having thus described the invention, what is claimed as new and desired to be secured by Letters Patent is:

1. A cooker of the character described comprising a base; a tray mounted on the base; electrodes carried by the base and depending into said tray at opposite sides thereof; electrical conductors to supply current to said electrodes; and means controlled by the material being cooked to break the connection when the same assumes a predetermined size.

2. A cooker of the character described comprising a base; a tray mounted on the base; electrodes carried by the base and depending into said tray at opposite sides thereof; electrical conductors to supply current to said electrodes; and means controlled by the material being cooked to break the connection when the same assumes a predetermined size, said means including an overhanging arm and a member adjustable toward and from the material being cooked.

3. In an electric cooker; a base; a tray mounted thereon; electrodes depending into said tray at opposite sides thereof; means for supplying current to the electrodes; a switch to make and break said means; and a switch having an adjustable member projecting into said tray, pivotally carried by the base, said switch arm being movable to break the current supply means when the material being cooked reaches a predetermined size.

4. In an electric cooker; a base; a tray mounted thereon; a plurality of partitions within said tray forming material compartments; electrode compartments formed in each material compartment; electrodes having a portion projecting into said electrode compartments; and a passage establishing communication between each material compartment and its electrode compartments whereby a constant water level may be maintained in all compartments.

5. In an electric cooker; an electric circuit operable to open and close the same; a switch interposed within said circuit; an arm joining said switch and material being cooked, and an electrode in spaced relation with the material at each of the opposed sides respectively thereof, said arm engaging the material between said electrodes and movable to operate said switch when the material attains a predetermined size.

6. In an electric cooker; an electric circuit; a switch interposed within said circuit; an arm joining said switch and material being cooked, and an electrode in spaced relation with the material at each of the opposed sides respectively thereof, said arm engaging the material between said electrodes, said arm being pivotally supported between said switch and material whereby alteration of the size of said material caused by electricity passing from one electrode to the other will move said arm about said pivotal support to open the switch.

7. In an electric cooker, a tray; a plurality of compartments formed therein to receive material to be cooked; an electric circuit to supply heat for cooking the material; a switch forming a part of said circuit; and a pivotally supported arm in operative engagement with said switch and having a portion thereof projecting into one of said tray compartments to engage the material being cooked, said arm being moved to operate the switch when the material attains a predetermined size.

8. In an electric cooker, spaced apart electrodes; means for supplying current to the electrodes; a switch forming a part of said means; and a switch operating arm terminating between said electrodes, adapted to be moved to operate the switch when the material being cooked between the electrodes attains a predetermined size.

9. In an electric cooker, spaced apart electrodes; means for supplying current to the electrodes; a conducting liquid submerging said electrodes; a switch forming a part of said current supply means; and a switch operating arm adapted to open said switch when material being cooked in the liquid between said electrodes becomes a predetermined size.

HARRY C. WARNER.